United States Patent Office 2,783,121
Patented Feb. 26, 1957

2,783,121

OXIDATION DYEING WITH ANILINE-4-SULFAMIC ACID

Robert Lazare Lantz and Pierre Marie Joseph Obellianne, Paris, France, assignors to Compagnie Française des Matieres Colorantes S. A. R. L., Paris, France No Drawing. Application November 24, 1952,
Serial No. 322,358

Claims priority, application France November 28, 1951

5 Claims. (Cl. 8—32)

The present invention concerns improvements in and relating to oxidation coloring matters.

French Patent No. 820,395 of July 15, 1936, and corresponding British Patent No. 498,755 disclose the obtaining of colorations of fibres by the oxidation of aromatic sulphamic acids or of their salts. However it does not mention the use of any product of this constitution derived from a benzene diamine, except sulphamic acids of aminodiphenylamine and its substitution products. With the latter one obtains colorations which are generally black or very nearly black.

It has now been found that valuable shades, usually different from the foregoing, can be obtained by oxidising, on the fibre, the sulphamates of benzene diamines each amino group of which may be substituted at most by one alkyl, arylalkyl or cycloalkyl group. The oxidation can, if desired, be preceded by the action of an acid.

Suitable compounds for use in the present invention are, for example, salts of these acids having the general formula

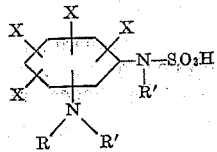

wherein:
R represents a hydrogen atom or an —SO₃H group,
R′ represents a hydrogen atom, or an alkyl, cycloalkyl or arylalkyl group, and
X represents a hydrogen or halogen atom or an alkyl, alkoxy or nitro group.

1:4-diaminobenzene-N-sodium sulphonate, 1:3-diaminobenzene-N-sodium sulphate, 1:2-diaminobenzene-N-sodium sulphonate, 2:4-diamino-1-methyl-benzene-N²-sodium sulphonate, 1:4-diaminobenzene-N¹:N⁴-sodium disulphonate are specific examples of sulphamates which may be used in this invention.

All these products are known having already been prepared, in particular by the processes described in French Patent No. 634,199 of February 22, 1927, and in German Patent No. 221,301 of January 9, 1909.

It is possible to use the following sulphamates, which are novel: 1-methyl-3:4-diaminobenzene-N⁴-sodium sulphonate, 1-methyl-2:5-diaminobenzene-N²-sodium sulphonate, 4-chloro-1:2-diamino-benzene-N¹-sodium sulphonate, 3-chloro-1:4-diaminobenzene-N¹-sodium sulphonate, 3-chloro-1:4-diamino-benzene-N⁴-sodium sulphonate, 2:4-diamino-1-methoxy benzene-N²-sodium sulphonate, 2:5-diamino-1-methoxy benzene-N²-sodium sulphonate, N¹-methyl-1:4-diaminobenzene-N¹-sodium sulphonate, N²-ethyl-2:5-diamino-1-methyl benzene-N²- sodium sulphonate, 4-chloro-2:5-diamino-1-methoxy benzene-N⁵-sodium sulphonate, 2:4-diamino-1:3-dimethyl benzene-N⁴-sodium sulphonate, 5-methyl-2:4-diamino-1-methoxy benzene-N²-sodium sulphonate, 2:6-dichloro-1:4-diaminobenzene-N⁴-sodium sulphonate, 3:4-diamino-1-methoxy benzene-N⁴-sodium sulphonate, 2:5-dichloro-1:4-diaminobenzene - N¹ - sodium sulphonate, 2:5:6-trichloro-1:4-diaminobenzene-N⁴-sodium sulphonate, 3-nitro - 1:4 - diaminobenzene - N¹ - sodium sulphonate, N¹-methyl-1:4-diaminobenzene-N⁴-sodium sulphonate.

The first fourteen new sulphamates can be obtained starting with nitro derivatives of aniline or of its substitution products by the action of a sulphonating agent in the presence of a tertiary base, such as pyridine, and reduction of the product obtained. 2:5-dichloro-1:4-diaminobenzene-N¹-sodium sulphonate can be prepared by the sulphonation, in pyridine, of 4-acetyl-amino-2:5-dichloro-1-amino-benzene followed by deacetylation. 2:5:6-trichloro-1:4-diaminobenzene-N⁴-sodium sulphonate can be prepared by the partial sulphonation, in pyridine, of 2:5:6-trichloro-1:4-diaminobenzene, and 3-nitro-1:4-diaminobenzene-N¹-sodium sulphonate by partial sulphonation of 3-nitro-1:4-diaminobenzene in the presence of a tertiary amine, such as pyridine. As for N¹-methyl-1:4-diaminobenzene-N⁴-sodium sulphonate it can be prepared by the action of sodium bisulphite on the acetylated derivative of 4-nitro-methyl-aminobenzene followed by saponification of the acetyl group.

Oxidising agents which may be used in the process of the present invention are, for example, the chlorates, chromates, bichromates, nitrites and peroxides such as hydrogen peroxide or sodium peroxide.

In certain cases it is useful to use an oxidation catalyst chosen preferably from amongst those known to be suitable in the preparation of oxidation coloring matters on fibres. Suitable catalysts are, for example, the derivatives of cerium, osmium, vanadium (vanadates, vanadium chloride) and copper, and the ferrocyanides.

One way of carrying out the process of this invention consists in placing the sulphamate, the oxidising agent and, if necessary, the catalyst on the fibre in one or more operations by dyeing, padding, printing etc. and in effecting the development by the action of an acid which may be dissolved in a bath in which the fibre is plunged, or mixed with steam or air with which the fibre is brought into contact, or formed on the fibre by the transformation of a substance which has been previously placed thereon. This latter transformation can be brought about, in particular by contact of the fibre with air which is more or less moist and warm or with neutral steam or steam containing a volatile acid, such as acetic or formic acid. The substances capable of forming an acid in these conditions are for example the salts of volatile bases such as ammonia, amides, and organic esters, mineral sulphonates, such as fluorosulphonate, aminosulphonate, nitrilosulphonate, iminosulphonate and hydroxylamine di- and tri-sulphonates. Several of these acidifying substances may be used simultaneously. It is often useful to render alkaline the mixture employed in this method and for this purpose a substance is used which, depending on the nature of the fibre and the method of development, can be, for example, an alkaline hydroxide, a carbonate, ammonia or an amine. Those alkaline substances which are volatile have the advantage that they can be eliminated in the course of the drying or of the development when the latter is effected in air or steam.

The other methods of bringing about the oxidation of the sulphamates on the fibre mentioned in French Patent No. 820,395 or corresponding British Patent No. 498,755 are equally applicable to the present invention. This operation may be effected in particular by introducing the fibre into a bath containing the sulphamate, an oxidising agent, the acid or a substance which will yield the acid and, if necessary, a catalyst. The sulphamate can also be applied to the fibre, and then treated by the oxidising agent.

In all the methods of working, the oxidation can be followed by an acid treatment designed to complete it, or to bring about or end the elimination of sulphonic groups remaining on the coloring matter formed. In certain cases, it may be of interest, after having placed the sulphamate on the fibre, only to oxidize it after partial or complete elimination of the sulphonic acid groups united to the nitrogen atoms of its amino groups. The elimination of the sulphonic acid groups may be brought about by the action of an acid acting either before the oxidation or in the course of the latter.

In the process of the invention one may use mixtures of the sulphamates defined above, either amongst themselves, or with other sulphamates, or with different bodies known to yield oxidation coloring matters and more particularly oxidation coloring matters on furs, in admixture with diamines; amongst these bodies may be mentioned aromatic dihydroxy or aminohydroxy derivatives, such as, for example, resorcinol, the dihydroxy naphthalenes, and the aminophenols. The use, according to the invention, of such mixtures is naturally not limited to the coloration of furs.

The printing colors and baths used for the padding or dyeing can contain known auxiliary substances, such as solvents, substances which improve wetting or penetration, hygroscopic substances, substances designed to prevent too high an acidity, such as bodies having a buffer action, for example, salts of weak acids, and substances designed to prevent over-oxidation or premature oxidation of the pastes before or after printing, for example, reducing agents.

After development of the coloring matter, the fibre can be made to undergo the treatments generally used for fibres or objects dyed or printed with insoluble coloring matters. The shades obtained, generally brown, are however sharply different according to the nature of the sulphamate used.

The present process can be used for dyeing wool, silk, furs, feathers, horsehair, bristles, human hair or other similar materials as well as for printing such fibres as cellulosic fibres, animal fibres, fibres of superpolyamides, etc. The colorations can be brought about not only on these fibres, but equally on objects formed from the same substances, or substances of similar constitution.

Although the sulphamates used in the present invention have never been used to obtain oxidation coloring matters certain of the diamines from which they are derived have already been used for the dyeing of furs, and one of them, paraphenylene diamine, has been employed in industry for the coloration of cellulosic fibres. The use of this base presents a certain number of disadvantages. One of them, which is well known, results from its property of causing dermatoses. Moreover the dull violet brown shade which it gives on cellulosic fibres does not always correspond with the desire of the user to produce redder, more yellow, or brighter shades. Moreover the mixtures which are used for printing it are not stable and tend to develop themselves spontaneously, both before and after their application to the fibre.

The process according to the invention is free from these defects. The mixtures which it employs have no action on the human body, and keep well. The same is true of fabrics with which they are impregnated or printed but not developed. Another important advantage which follows from using the mixtures of this invention is that a wide range of shades can be obtained.

In printing, the present process allows the conjoint use of other important coloring matters, such as the sulphuric esters of leuco derivatives of vat dyes (Solasol, Indigosol), the mixtures known under the names of Naphthazogene and Rapidogene containing diazoamino derivatives of amines free from solubilizing groups and coupling components which are also free from solubilizing groups. These coloring matters can be printed side by side with those of the invention or even mixed therewith. The mixtures thus obtained may be placed on the fibre by impregnation or padding. They are preferably developed in one operation by an operation suiting simultaneously the two categories of coloring matters although each coloring matter can equally be developed by a special operation.

One can also effect reserves or white or colored discharges on fabrics colored according to the invention. A simple process for obtaining these effects consists in printing the mixtures which furnish them on a fabric previously padded with a sulphamate of a diamine and dried, but not developed. The development is then effected in a phase suiting the coloring matters of the reserves, and that of the invention, or in several phases. This process is suitable in particular, for the printing of vat dyestuffs on grounds obtained with sulphamates of diamines.

The invention will be more clearly understood by reference to the following examples which are purely illustrative.

*Example 1*

A cotton fabric is printed with the following mixture:

| | Grams |
|---|---|
| 1:4-diaminobenzene-N-sodium sulphonate | 40 |
| Sodium chlorate | 20 |
| Ammonium chloride | 40 |
| 1% ammonium vanadate | 20 |
| 20% ammonia | 10 |
| Water and starch thickener | 870 |
| | 1,000 |

After drying the fabric is steamed for 8 minutes in neutral steam, washed and soaped by boiling in the usual manner. Brown prints are obtained.

Similar shades are obtained by printing, under the same conditions, fabrics of cellulose acetate, chlorinated wool, silk, mercerized cotton or regenerated cellulose. The most intense colors are obtained on this latter fibre and the least intense on silk.

By replacing the 1:4-diamino benzene-N-sodium sulphonate by equivalent quantities of other sulphamates of diamines, the following shades are obtained:

| | |
|---|---|
| 1:3 - diamino - benzene - N - sodium sulphonate | Brown. |
| 1:2 - diamino - benzene - N - sodium sulphonate | Brown. |
| 1:4 - diamino - benzene - $N^1$:$N^4$ - sodium disulphonate | Brown. |
| 3 - nitro - 1:4 - diamino - benzene-$N^1$-sodium sulphonate | Yellowish brown. |
| $N^1$ - methyl - 1:4 - diamino - benzene-$N^4$-sodium sulphonate | Brown. |
| 4 - chloro - 1:2 - diamino - benzene-$N^1$-sodium sulphonate | Yellowish brown. |
| 3 - chloro - 1:4 - diamino - benzene-$N^1$-sodium sulphonate | Reddish brown. |
| 3 - chloro - 1:4 - diamino - benzene-$N^4$-sodium sulphonate | Reddish brown. |
| 2:4 - diamino - 1 - methoxybenzene-$N^2$-sodium sulphonate | Reddish brown. |
| 2:5 - diamino - 1 - methoxy - benzene-$N^2$-sodium sulphonate | Reddish brown. |
| $N^1$ - methyl - 1:4 - diamino - benzene-$N^1$-sodium sulphonate | Brown black. |
| 2:6 - dichloro - 1:4 - diamino - benzene-$N^4$-sodium sulphonate | Yellowish Brown. |
| 2:5 - dichloro - 1:4 - diamino - benzene-$N^1$-sodium sulphonate | Brown. |
| 2:5:6 - trichloro - 1:4 - diamino - benzene-$N^4$-sodium sulphonate | Brown. |
| 4 - chloro - 2:5 - diamino - 1 - methoxy benzene-$N^5$-sodium sulphonate | Brown. |
| 3:4 - diamino - 1 - methoxy benzene-$N^4$-sodium sulphonate | Yellowish brown. |

Example 2

A cotton fabric is printed with the following mixture:

| | Grams |
|---|---|
| 3:4 - diamino - 1 - methylbenzene - $N^4$ - sodium sulphonate | 44 |
| Sodium chlorate | 40 |
| Ammonium chloride | 40 |
| 1% solution of ammonium vanadate | 20 |
| 20% ammonia | 10 |
| Water and starch thickener | 846 |
| | 1,000 |

After having been dried, the fabric is steamed for 8 minutes in neutral steam, washed and soaped in boiling water in the usual manner. Brown yellow prints are obtained.

By replacing the 3:4-diamino-1-methyl benzene-N-sodium sulphonate by equivalent quantities of other sulphamates the following shades are obtained:

| | |
|---|---|
| 2:4 - diamino - 1 - methyl benzene-$N^2$-sodium sulphonate | Yellowish brown. |
| 2:5 - diamino - 1 - methyl benzene-$N^2$-sodium sulphonate | Reddish brown. |
| $N^2$ - ethyl - 2:5 - diamino - 1 - methyl benzene - $N^2$ - sodium sulphonate | Greenish yellow brown. |
| 2:4 - diamino - 1:3 - dimethyl-benzene-$N^4$-sodium sulphonate | Yellowish brown. |
| 5 - methyl - 2:4 - diamino - 1-methoxy benzene - $N^2$ - sodium sulphonate | Yellowish brown. |

Example 3

A cotton fabric is printed with the following mixture:

| | Grams |
|---|---|
| 1:4-diaminobenzene-N-sodium sulphonate | 20 |
| 1:3-diaminobenzene-N-sodium sulphonate | 20 |
| Sodium chlorate | 20 |
| Ammonium chloride | 40 |
| 1% ammonium vanadate | 20 |
| 20% ammonia | 10 |
| Water and starch thickener | 870 |
| | 1,000 |

After drying, the fabric is steamed for 8 minutes in neutral steam, then washed and soaped in boiling water in the usual manner. Brown prints are obtained.

Example 4

The following mixture is printed on a cotton fabric:

| | Grams |
|---|---|
| 1:2-diamino-benzene-N-sodium sulphonate | 40 |
| Sodium chlorate | 20 |
| 1% solution of ammonium vanadate | 20 |
| 20% solution of ammonia | 10 |
| Starch tragacanth thickener | 910 |
| | 1,000 |

After drying the fabric is steamed for 8 minutes in acetic or formic acid vapour and finished as in the foregoing examples. Brown yellow prints are obtained.

Example 5

The following mixture is printed on a cotton fabric:

| | Grams |
|---|---|
| 1:4-diamino-benzene-N-sodium-sulphonate | 40 |
| Sodium chlorate | 20 |
| Ammonium chloride | 40 |
| 10% sodium ferrocyanide solution | 20 |
| 20% ammonia | 10 |
| Water and starch thickener | 870 |
| | 1,000 |

After drying, the fabric is steamed for 8 minutes in neutral steam and the usual treatment applied. Brown prints are obtained.

Example 6

The following mixture is printed on a cotton fabric:

| | Grams |
|---|---|
| 1:4-diamino-benzene-N-sodium sulphonate | 40 |
| 50% solution of sodium bichromate | 50 |
| Ammonium chloride | 60 |
| 20% ammonia | 10 |
| Water and starch thickener | 840 |
| | 1,000 |

After drying, the fabric is steamed for 10 minutes in neutral steam. After the usual treatments, brown prints are obtained.

Example 7

A cotton fabric is printed with the following mixture:

| | Grams |
|---|---|
| 1:4-diamino-benzene-N-sodium sulfonate | 40 |
| Sodium chlorate | 20 |
| 1% solution of ammonium vanadate | 20 |
| 20% ammonia | 10 |
| Water and starch thickener | 910 |
| | 1,000 |

After drying, the fabric is steamed for 20 minutes in steam containing acetic acid, then it is plunged into a bath containing 40 cc. of 95% sulphuric acid, and 40 grs. of anhydrous sodium sulphate per litre for 1 minute at 80° C. The fabric is washed in boiling water and brown prints are obtained.

Example 8

The following mixture is printed on a cotton fabric:

| | Grams |
|---|---|
| 1:4-diamino-benzene-N-sodium sulphonate | 40 |
| Resorcinol | 24 |
| Sodium chlorate | 20 |
| Ammonium chloride | 40 |
| 1% solution of ammonium vanadate | 20 |
| 20% ammonia | 10 |
| Water and starch thickener | 846 |
| | 1,000 |

After drying, the fabric is steamed for 8 minutes in neutral steam, and treated as in the foregoing examples. Brown prints are obtained. By replacing the resorcinol with 32 gms. of 1:5-dihydroxy-naphthalene, or 24 gms. of pyrocatechol, the shades obtained are similar.

Example 9

A cotton fabric is printed with the following mixture:

| | Grams |
|---|---|
| 1:4-diamino-benzene-N-sodium sulphonate | 20 |
| Sulphuric ester of the leuco derivative of dibenzpyrene quinone | 30 |
| Sodium chlorate | 20 |
| Ammonium chloride | 20 |
| 20% ammonia | 10 |
| 1% solution of ammonium vanadate | 30 |
| Water and starch thickener | 870 |
| | 1,000 |

The fabric is dried and steamed for 8 minutes in neutral steam and washed in boiling water. Brown yellow prints are obtained.

Example 10

A cotton fabric is printed with the following mixture:

| | Grams |
|---|---|
| 1:4-diamino-benzene-N-sodium sulphonate | 40 |
| Commercial mixture of the diazoamino derivative resulting from the condensation of diazotized 5-chloro-2-aminotoluene with 2-acetoactylamino-5-chloro-1-methyl benzene | 40 |
| Sodium chlorate | 20 |
| 38°Bé. soda lye | 20 |
| 1% solution of ammonium vanadate | 20 |
| Water and starch thickener | 860 |
| | 1,000 |

After drying, the fabric is steamed for 8 minutes in acetic acid vapour or formic acid vapour and washed in boiling water; one obtains a brown-yellow shade.

Example 11

A cotton fabric is padded with the following mixture:

| | Grams |
|---|---|
| 1:4-diamino-benzene-N-sodium sulphonate | 16 |
| Sodium chlorate | 8 |
| Ammonium chloride | 16 |
| 1% ammonium vanadate solution | 8 |
| Water and starch thickener | 952 |
| | 1,000 |

The fabric is dried and steamed for 10 minutes, and soaped with boiling water. The cotton is dyed brown.

Example 12

A chrome-tanned rabbit skin is dipped into 20 times its weight of the following solution:

| | | |
|---|---|---|
| 1:4-diamino-benzene-N-sodium sulphonate | gram | 1 |
| 36% hydrochloric acid | ccs | 5 |
| 12 volume hydrogen peroxide | ccs | 15 |
| Water | ccs | 200 |

The temperature of the bath is raised to 25-30° C., and the fur is left therein for 6 hours. After rinsing in water the fur is dyed beige.

Example 13

A cotton fabric is padded according to Example 11 and then, after having been dried at low temperature and without steaming, it is printed with the following mixtures:

| | Grams |
|---|---|
| Dibenzpyrene quinone | 20 |
| Potassium carbonate | 26 |
| Sodium carbonate | 18 |
| Formaldehyde hydrosulphite | 90 |
| Water and starch thickener | 846 |
| | 1,000 |

| | |
|---|---|
| Potassium carbonate | 30 |
| Formaldehyde hydrosulphite | 90 |
| Water and starch thickener | 880 |
| | 1,000 |

The fabric is then steamed for 10 minutes in neutral steam. After the usual treatment yellow and white prints on a brown ground are obtained.

We claim:

1. Process for the preparation of colouring matters on fibres by the oxidation, with an oxidising agent, of a salt of a sulphamic acid of a benzene diamine of the following formula:

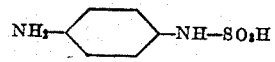

2. Process for the preparation of colouring matters on fibres by the oxidation, in the presence of an oxidation catalyst, of a salt of a sulphamic acid of a benzene diamine of the following formula:

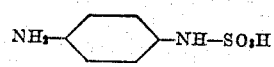

3. Process for the preparation of colouring matters on fibres by the oxidation of a salt of a sulphamic acid of a benzene diamine of the following formula:

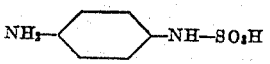

in which the development is effected by the action of acid.

4. Process for the preparation of colouring matters on fibres by the oxidation of a salt of a sulphamic acid of a benzene diamine of the following formula:

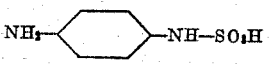

in which development is effected by the action of a substance yielding acid.

5. Process for the preparation of colouring matters on fibres by the oxidation of a salt of a sulphamic acid of a benzene diamine of the following formula:

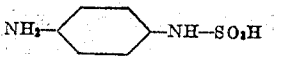

References Cited in the file of this patent

UNITED STATES PATENTS

| 739,071 | Fourneaux | Sept. 15, 1903 |
| 1,011,084 | Schmid | Dec. 5, 1911 |

FOREIGN PATENTS

| 498,755 | Great Britain | Jan. 9, 1939 |